(12) United States Patent
Usuda et al.

(10) Patent No.: US 8,437,755 B2
(45) Date of Patent: May 7, 2013

(54) TRANSMISSION SPEED CONTROL METHOD, WIRELESS BASE STATION AND WIRELESS CIRCUIT CONTROL STATION

(75) Inventors: Masafumi Usuda, Tokyo (JP); Anil Umesh, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 697 days.

(21) Appl. No.: 11/886,321

(22) PCT Filed: Mar. 17, 2006

(86) PCT No.: PCT/JP2006/305429
§ 371 (c)(1),
(2), (4) Date: Nov. 26, 2007

(87) PCT Pub. No.: WO2006/098439
PCT Pub. Date: Sep. 21, 2006

(65) Prior Publication Data
US 2008/0194263 A1 Aug. 14, 2008

(30) Foreign Application Priority Data
Mar. 18, 2005 (JP) .................................. 2005-080718

(51) Int. Cl.
*H04W 36/00* (2009.01)
(52) U.S. Cl.
USPC ............ 455/436; 455/442; 455/522; 370/331
(58) Field of Classification Search .................. 455/442, 455/522–525, 436–439; 370/331
See application file for complete search history.

(56) References Cited

U.S. PATENT DOCUMENTS

| 2004/0072565 | A1* | 4/2004 | Nobukiyo et al. ............ 455/436 |
| 2004/0218533 | A1 | 11/2004 | Kim et al. |
| 2004/0228349 | A1 | 11/2004 | Vrzic et al. |
| 2005/0220052 | A1* | 10/2005 | Uehara et al. ................. 370/331 |
| 2006/0058054 | A1* | 3/2006 | Hiramatsu ..................... 455/522 |
| 2007/0086381 | A1* | 4/2007 | Lee et al. ...................... 370/331 |

FOREIGN PATENT DOCUMENTS

| JP | 2004-208197 | 7/2004 |
| JP | 2004-266812 | 9/2004 |
| WO | 2005/018114 A1 | 2/2005 |
| WO | 2005/018496 A2 | 3/2005 |

OTHER PUBLICATIONS

3GPP TR 25.896 V6.0.0 (Mar. 2004), 3rd Generation Partnership Project; Technical Specification Group Radio Access Network; Feasibility Study for Enhanced Uplink for UTRA FDD, Release 6, p. 1-179.
The Chinese office action issued on Oct. 14, 2011 in the counterpart Chinese patent application.

(Continued)

*Primary Examiner* — Chuong A Ngo
(74) *Attorney, Agent, or Firm* — Marvin A. Motsenbocker; Mots Law, PLLC

(57) ABSTRACT

The present invention relates to a transmission rate control method for controlling a transmission rate of user data transmitted from a mobile station to a radio base station, including: notifying, from a radio network controller to the radio base station, a transmission rate difference or a transmission rate ratio between a transmission rate of a mobile station performing a soft handover and a transmission rate of a mobile station not performing the soft handover, the soft handover performed between the mobile station and the radio base station under the radio network controller; and controlling, at the radio base station, the transmission rate of each mobile station according to the notified transmission rate difference or the notified transmission rate ratio.

6 Claims, 8 Drawing Sheets

OTHER PUBLICATIONS

Samsung; "Node B controlled scheduling in SHO"; 3GPP TSG-RAN WG1 Rel-6 Ad Hoc; Tdoc R1-040695; Agenda item 5, 6.3, Cannes, France (Jun. 21-24, 2004).

The extended European search report issued on Feb. 3. 2011 in the counterpart European patent application.

The Chinese office action issued on May 3, 2012 in the counterpart Chinese patent application.

The extended European search report issued on Jan. 21, 2013 in the counterpart European patent application.

* cited by examiner (a) OCCURRENCE OF TRAFFIC

☒ DATA OF MOBILE STATION A
☐ DATA OF MOBILE STATION B (b) RADIO TRANSMISSION

CASE OF TRANSMISSION BY
LOW-SPEED RADIO RESOURCE (c)

CASE OF TRANSMISSION BY
ENSURING HIGH-SPEED RADIO RESOURCE

TRANSMISSION SPEED CONTROL METHOD, WIRELESS BASE STATION AND WIRELESS CIRCUIT CONTROL STATION

TECHNICAL FIELD

The present invention relates to a transmission rate control method, a radio base station and a radio network controller for controlling a transmission rate of user data transmitted from a mobile station to a radio base station.

BACKGROUND ART

A mobile station performing soft handover (SHO) provides much interference to multiple cells. Accordingly, there is a known conventional technique for increasing a cell throughput by setting the transmission rate of a mobile station performing soft handover to be lower than the transmission rate of a mobile station not performing soft handover.

For example, according to Non-Patent Document 1, a cell throughput is enhanced by providing the maximum value such as 256 kbps or 512 kbps to a mobile station performing soft handover.

In contrast, when traffic is off-peak, a radio quality is rather improved if the transmission rate of a mobile station performing soft handover is set to be higher without such maximum value provided.

In other words, the providing of the maximum value of the transmission rate to the mobile station performing soft handover in a fixed manner deteriorates the radio quality at a time of off-peak traffic.

[Non-Patent Document 1] 3GPP TSG-RAN TR25.896 V6.0.0

DISCLOSURE OF THE INVENTION

Hence, the present invention has been made in consideration of the aforementioned point. An object of the present invention is to provide a mobile communication method, a mobile station and a base station with which: a radio network controller dynamically notifies a radio base station of a transmission rate difference or a transmission rate ratio between a transmission rates of a mobile station performing soft handover and a transmission rate of a mobile station not performing soft handover; the radio base station controls the transmission rate of each mobile station according to the transmission rate difference or the transmission rate ratio; and thereby the radio quality can be improved by eliminating the difference between the transmission rates of the mobile station performing a soft handover and the transmission rate of the mobile station not performing the soft handover when traffic is off-peak, while the throughput of the entire cell can be increased by decreasing the transmission rate of the mobile station performing soft handover when the traffic becomes congested.

Instead, an object of the present invention is to provide a mobile communication method, a mobile station and a base station capable of obtaining the same effect as the aforementioned effect in a way that a radio network controller dynamically notifies a radio base station of the maximum value of the transmission rate of a mobile station performing a soft handover, and that the radio base station controls the transmission rate of each mobile station according to the maximum value of the transmission rate.

A first feature of the present invention is summarized as a transmission rate control method for controlling a transmission rate of user data transmitted from a mobile station to a radio base station, including: notifying, from a radio network controller to the radio base station, a transmission rate difference or a transmission rate ratio between a transmission rate of a mobile station performing a soft handover and a transmission rate of a mobile station not performing the soft handover, the soft handover performed between the mobile station and the radio base station under the radio network controller; and controlling, at the radio base station, the transmission rate of each mobile station according to the notified transmission rate difference or the notified transmission rate ratio.

A second feature of the present invention is summarized as a transmission rate control method for controlling a transmission rate of user data transmitted from a mobile station to a radio base station, including: notifying, from a radio network controller to the radio base station, a maximum value of the transmission rate of a mobile station performing soft handover with the radio base station under the radio network controller; and controlling, at the radio base station, the transmission rate of each mobile station according to the notified maximum value of the transmission rate.

A third feature of the present invention is summarized as a radio network controller used in a transmission rate control method for controlling a transmission rate of user data transmitted from a mobile station to a radio base station including: a notifying section configured to notify, to the radio base station, a transmission rate difference or a transmission rate ratio between a transmission rate of a mobile station performing a soft handover and a transmission rate of a mobile station not performing the soft handover, the soft handover performed between the mobile station and the radio base station under the radio network controller.

A fourth feature of the present invention is summarized as a radio network controller used in a transmission rate control method for controlling a transmission rate of user data transmitted from a mobile station to a radio base station, including: an maximum value notifying section configured to notify, to the radio base station, a maximum value of the transmission rate of a mobile station performing soft handover, the soft handover performed between the mobile station and the radio base station under the radio network controller.

A fifth feature of the present invention is summarized as a radio base station used in a transmission rate control method for controlling a transmission rate of user data transmitted from a mobile station to a radio base station, including: a determining section configured to determine a transmission rate difference or a transmission rate ratio between a transmission rate of a mobile station performing a soft handover and a transmission rate of a mobile station not performing the soft handover; and a controller configured to control the transmission rate of each mobile station according to the determined transmission rate difference or the determined transmission rate ratio.

A sixth feature of the present invention is summarized as a radio base station used in a transmission rate control method for controlling a transmission rate of user data transmitted from a mobile station to a radio base station, including: a maximum determining section configured to determine the maximum value of the transmission rate of a mobile station performing a soft handover; and a controller configured to control the transmission rate of each mobile station according to the determined maximum value of the transmission rate.

BEST MODES FOR CARRYING OUT THE INVENTION

Figure 1:
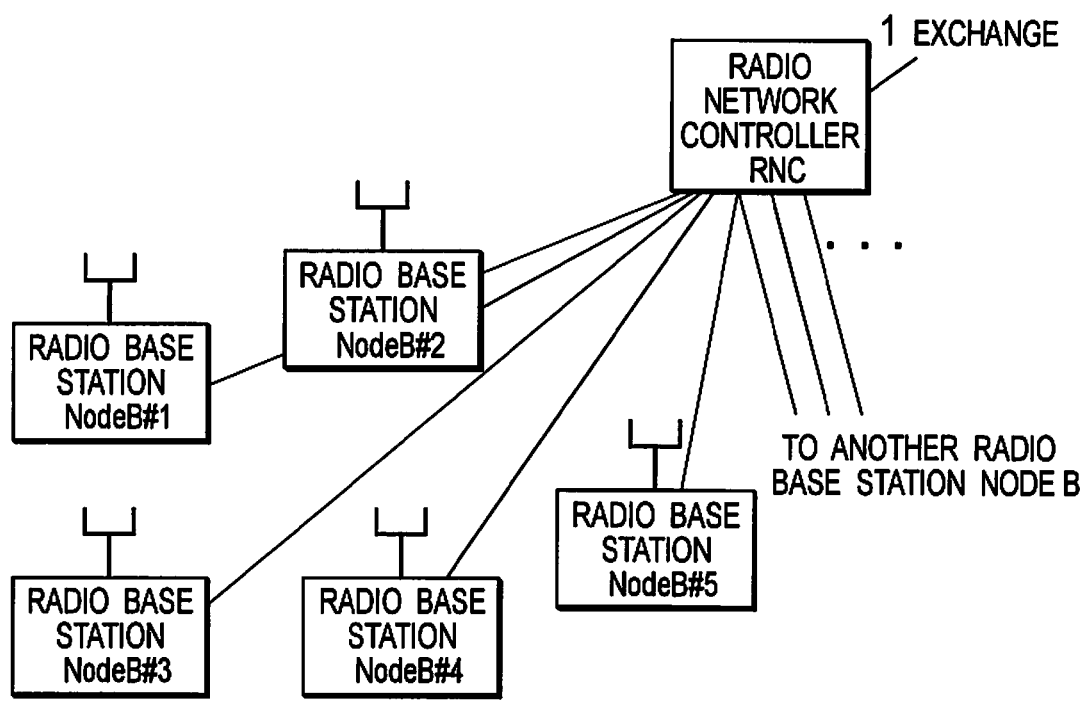
FIG. 1 is a configuration block diagram of a transmission rate control system according to a first embodiment of the present invention.
Figure 2:
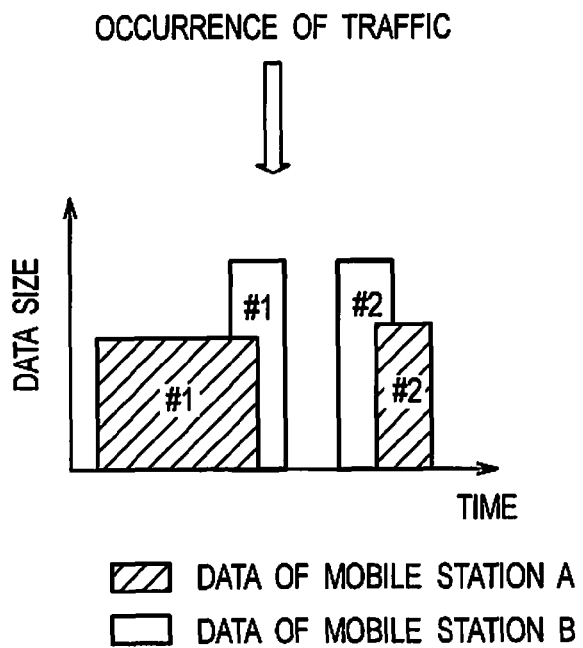
FIGS. 2(a) to (c) are diagrams for explaining data transmission of mobile stations according to the first embodiment of the present invention.
Figure 2:
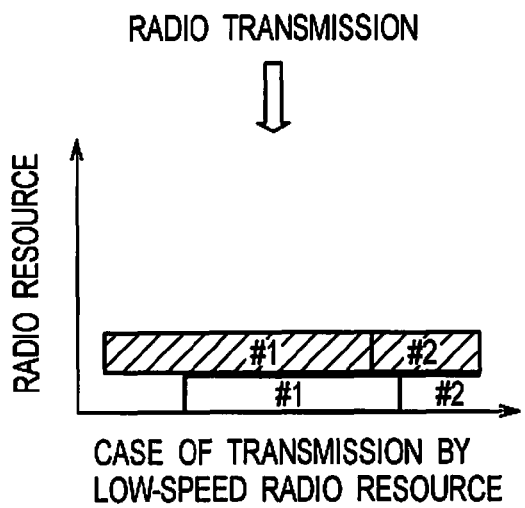
Figure 2:
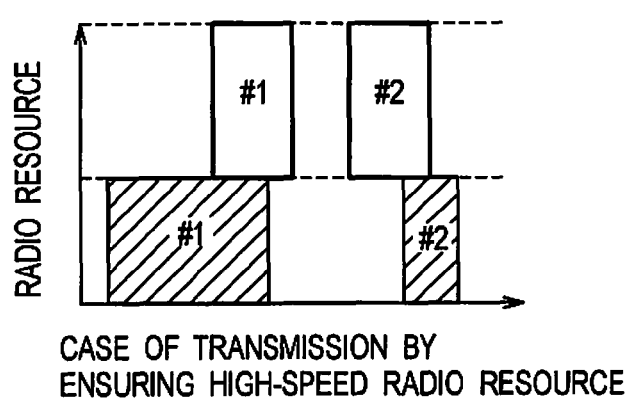
Figure 3:
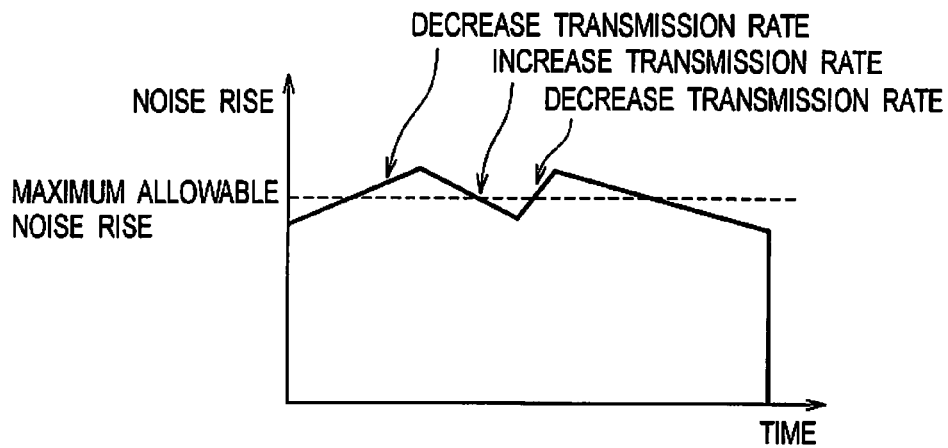
FIG. 3 is a graph showing a state of controlling a transmission rate according to the first embodiment of the present invention.

Hereinafter, transmission rate control systems according to first and second embodiments will be described with reference to the drawings. In the following descriptions of the drawings, the same or similar reference numerals are given to the same or similar elements. However, it should be noted that the drawings are schematic.
(First Embodiment)

With reference to FIGS. 4 to 12, descriptions will be provided for a transmission rate control system according to the first embodiment of the present invention.

Figure 4:
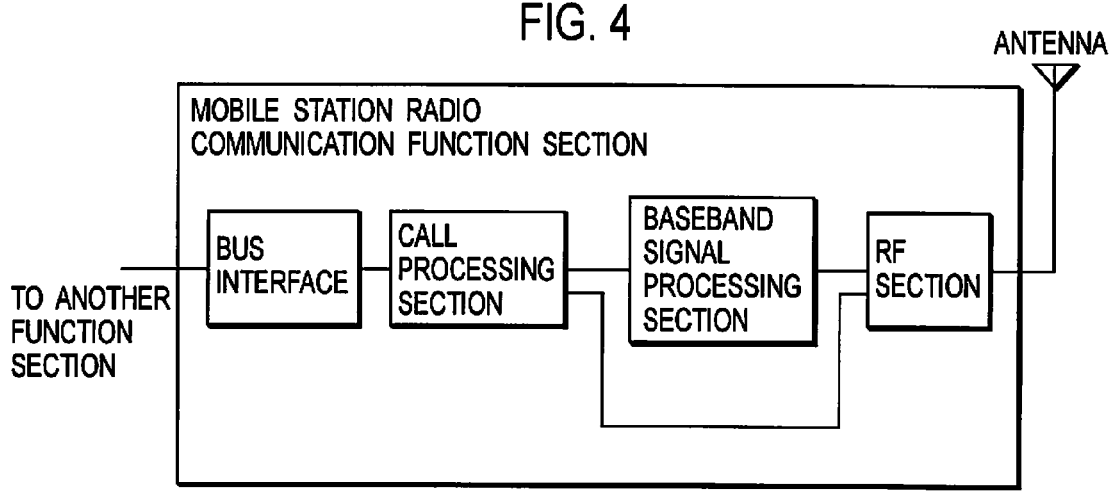
FIG. 4 is a configuration block diagram of a mobile station radio communication function section according to the first embodiment of the present invention.

As shown in FIG. 4, a mobile station radio communication function section provided in a mobile station in the transmission rate control system according to the first embodiment of the present invention includes a bus interface, a call processing section, a baseband signal processing section and an RF section.

Figure 5:
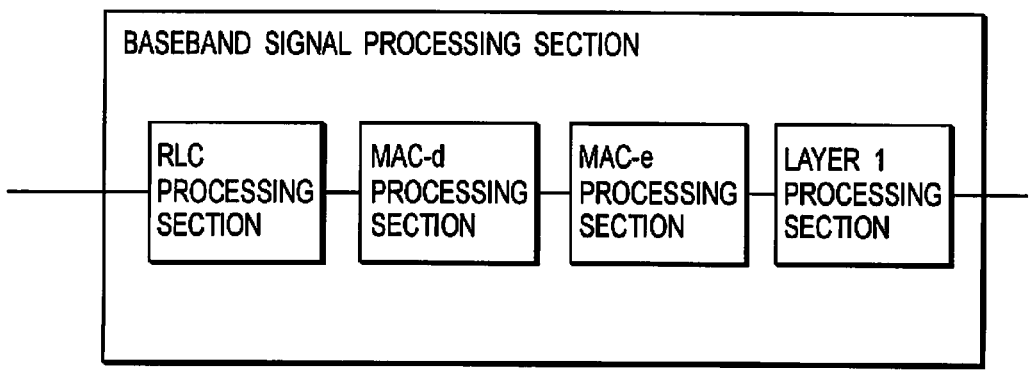
FIG. 5 is a configuration block diagram of a baseband signal processing section according to the first embodiment of the present invention.

In addition, as shown in FIG. 5, the baseband signal processing section includes an RLC processing section, a MAC-d processing section, a MAC-e processing section and a layer 1 processing section.

Figure 6:
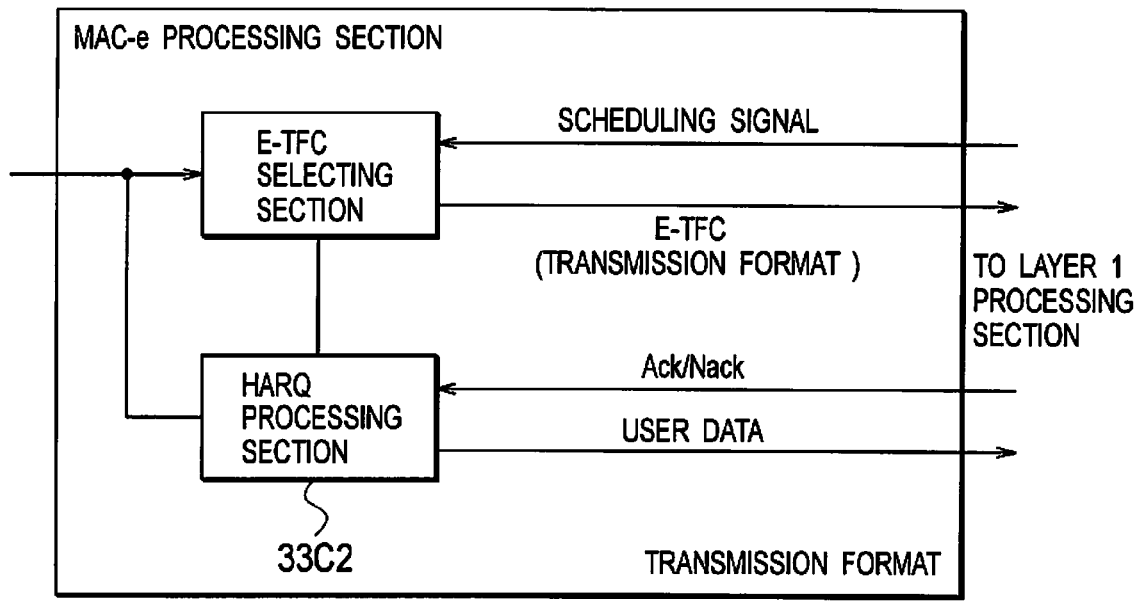
FIG. 6 is a configuration block diagram of a MAC-e section according to the first embodiment of the present invention.

Moreover, as shown in FIG. 6, the MAC-e processing section includes an E-TFC selecting section and an HARQ processing section.

Here, the E-TFC selecting section is configured: to receive a scheduling signal containing an absolute grant channel (E-AGCH), a relative grant channel (E-RGCH) or the like transmitted from a radio base station (cell); and to control a transmission rate of uplink user data of a mobile station (specifically, to select a transport format combination (E-TFC)) according to the absolute value of the maximum allowable transmission rate of uplink user data of the mobile station, the absolute value contained in the E-AGCH, or according to a relative value (Up/Down/Keep) of the maximum allowable transmission rate of uplink user data of the mobile station, the relative value contained in the E-RGCH.

Here, the "transmission rate" is defined by a transmission power of an uplink user data channel (such as an E-DPDCH), a transmission power ratio between the uplink user data channel (such as an E-DPDCH) and a reference control channel (such as a DPCCH), a transmission data block size on the uplink user data channel or the like.

Figure 7:
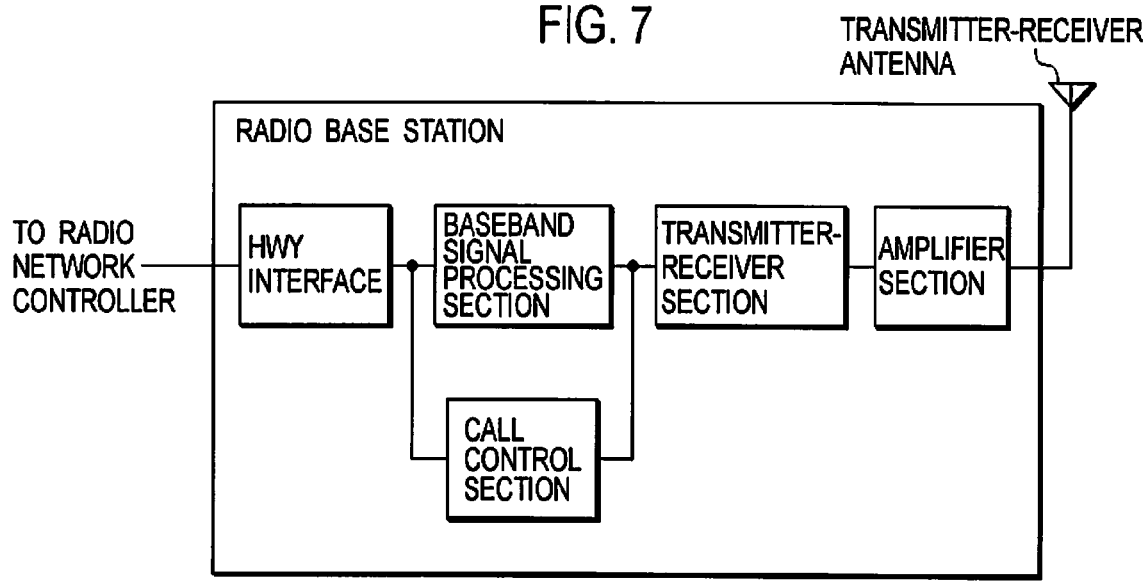
FIG. 7 is a configuration block diagram of a radio base station according to the first embodiment of the present invention.

As shown in FIG. 7, the radio base station (corresponding to each cell) in the transmission rate control system according to the first embodiment of the present invention includes an HWY interface, a baseband signal processing section, a call control section, a transmitter-receiver section and an amplifier section.

Figure 8:
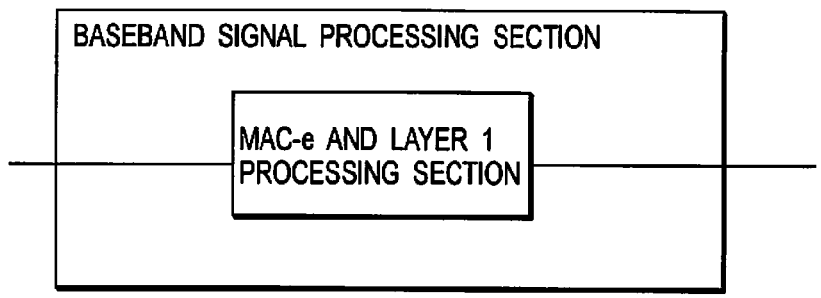
FIG. 8 is a configuration block diagram of a baseband signal processing section according to the first embodiment of the present invention.
Figure 9:
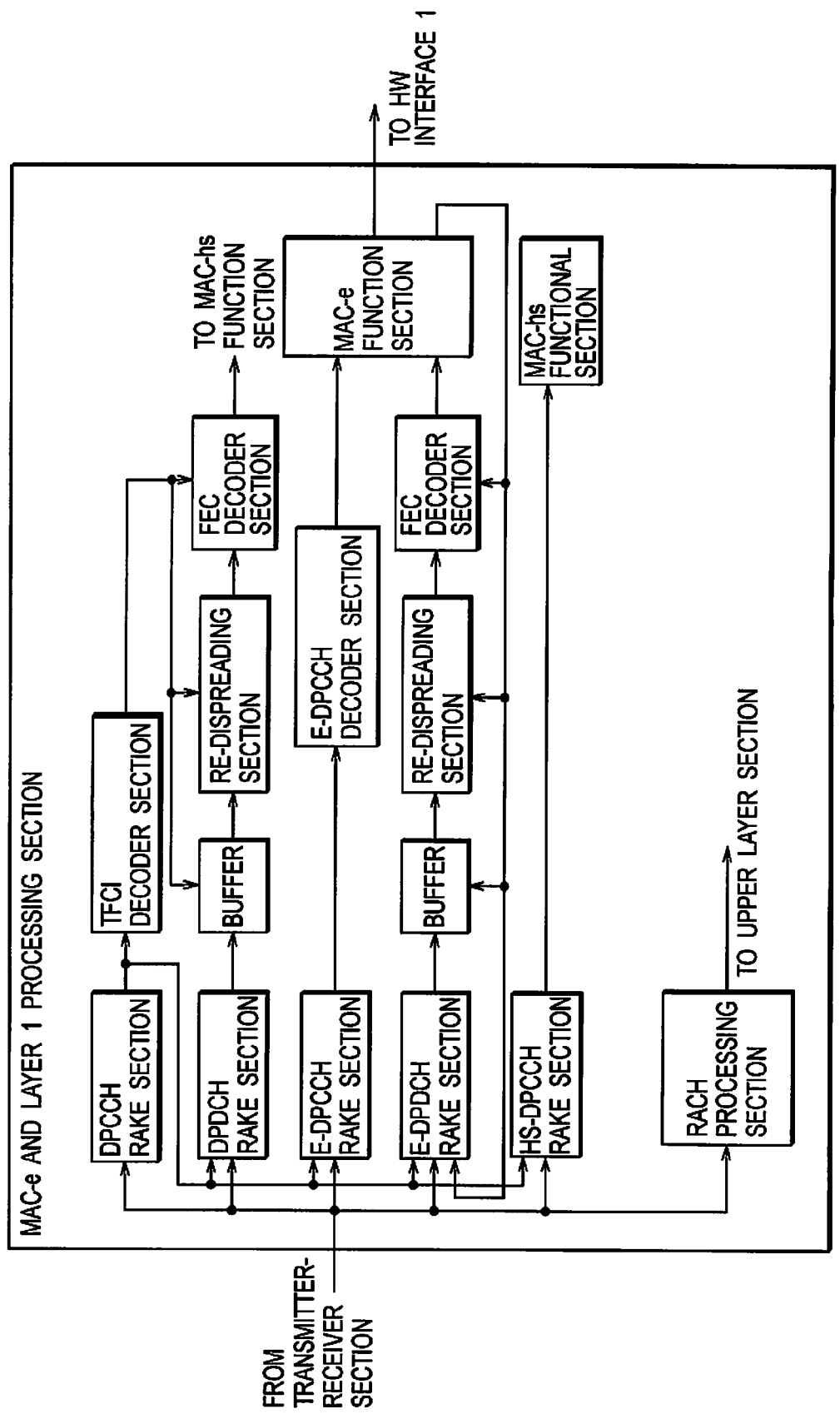
FIG. 9 is a configuration block diagram of a MAC-e and layer 1 processing section according to the first embodiment of the present invention.

In addition, as shown in FIG. 8, the baseband signal processing section includes a MAC-e and layer 1 processing section. Here, FIG. 9 shows a specific configuration example of the MAC-e and layer 1 processing section according to the present invention.

Figure 10:
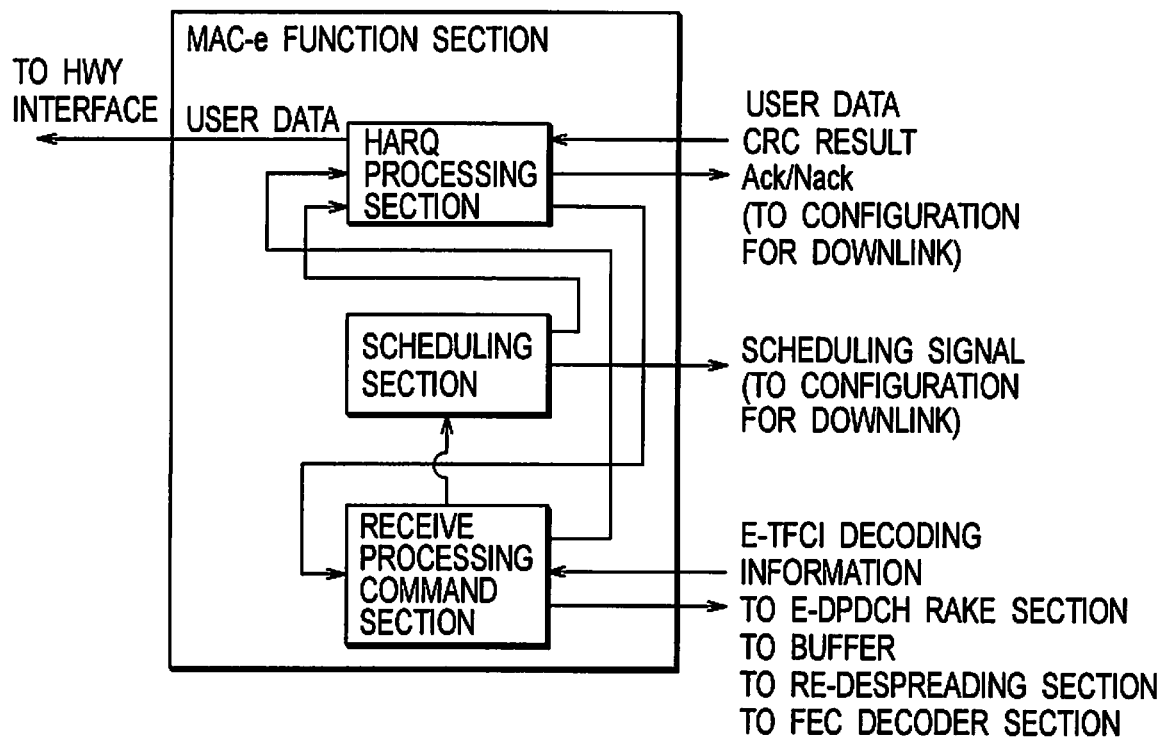
FIG. 10 is a configuration block diagram of a MAC-e function section according to the first embodiment of the present invention.

Moreover, as shown in FIG. 10, a MAC-e function section in the MAC-e and layer 1 processing section includes an HARQ processing section, a scheduling section and a receiving processing command section.

This scheduling section is configured to control a transmission rate of uplink user data of each mobile station according to a transmission rate difference or a transmission rate ratio between a transmission rate of the mobile station performing a soft handover and a transmission rate of a mobile station not performing the soft handover.

Moreover, this scheduling section may be configured to control the transmission rate of uplink user data of each mobile station according to the maximum value of the transmission rate of the mobile station performing the soft handover.

Here, the scheduling section maybe configured to control the transmission rate of uplink user data of each mobile station by transmitting the aforementioned absolute grant channel or relative grant channel to each mobile station.

Note that, in the transmission rate control system of this embodiment, the above-described transmission rate difference, transmission rate ratio and maximum value are transmitted from the ratio network controller.

Figure 11:
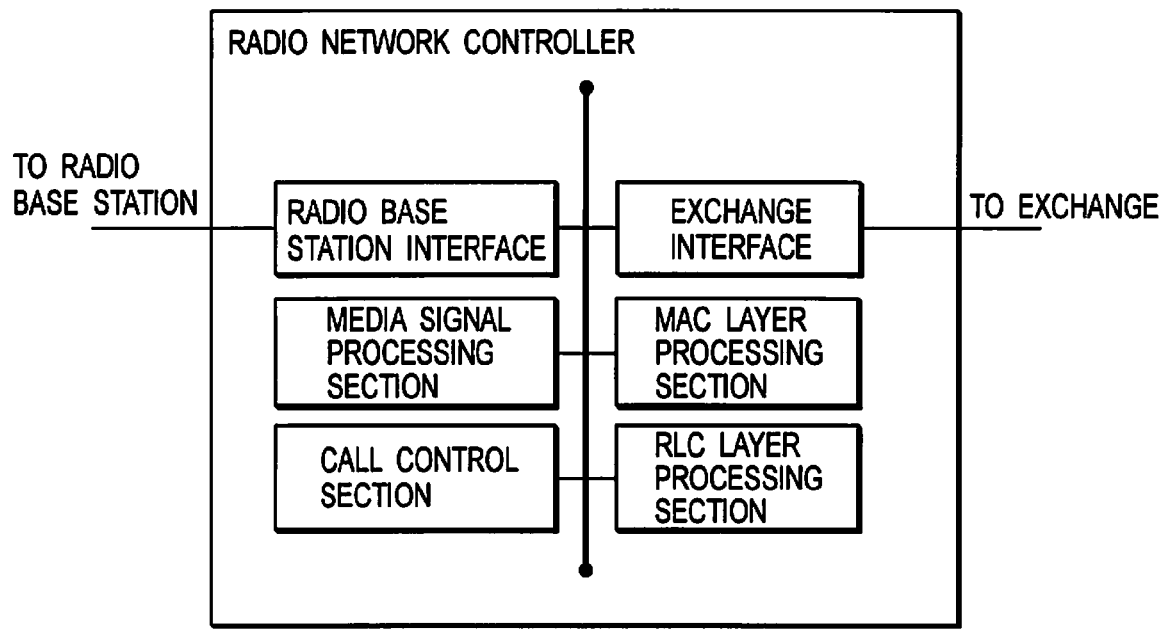
FIG. 11 is a configuration block diagram of a radio network controller according to the first embodiment of the present invention.

As shown in FIG. 11, the radio network controller includes a radio base station interface, an exchange interface, a media signal processing section, a MAC layer processing section, a call control section and an RLC layer processing section.

This call control section is configured: to determine the transmission rate difference or the transmission rate ratio between the transmission rates of the mobile station performing the soft handover and the transmission rate of the mobile station not performing the soft handover, the soft handover performed between the mobile station and the radio base stations under this call control section; and to notify the radio base station of the transmission rate difference or the transmission rate ratio.

Here, the call control section may be configured to notify, to the radio base station, the transmission rate difference or the transmission rate ratio according to a difference or a ratio between the absolute values of the maximum allowable transmission rate of uplink user data contained in the absolute grant channel (E-AGCH) transmitted from the radio base stations. Alternatively, the call control section may be configured to notify, to the radio base station, the transmission rate difference or the transmission rate ratio according to a difference or ratio between the bit rates on the uplink user data channel, the bit rates measured by the radio base stations.

Furthermore, the call control section may be configured to determine the maximum value of the transmission rate of the mobile station performing the soft handover, and to notify the radio base stations of the maximum value.

In this point, the call control section may be configured to notify, to the radio base station, the maximum value according to the absolute value of the maximum allowable transmission rate of the uplink user data contained in the absolute grant channel (E-AGCH) transmitted from the radio base stations. Alternatively, the call control section may be configured to notify, to the radio base station, the maximum value according to the bit rates on the uplink user data channel, the bit rates measured by the radio base stations.

Figure 12:
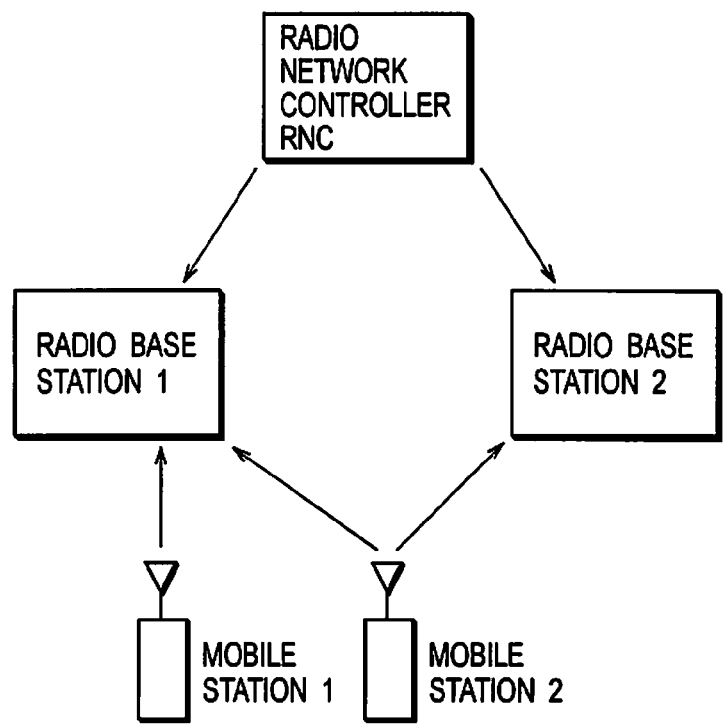
FIG. 12 is a diagram for explaining a transmission rate control method according to the first embodiment of the present invention.

Here, a specific example of the transmission rate control system according to this embodiment is described by referring to FIG. 12.

In the example shown in FIG. 12, it is assumed that a mobile station 1 communicates only with a radio base station 1 while a mobile station 2 performs the soft handover with the radio base station 1 and a radio base station 2.

A radio network controller RNC checks the congestion of traffic. If the traffic is congested, the radio network controller RNC notify, to the radio base station 1, a transmission rate ratio which is set to "80%" between the mobile station 2 performing the soft handover and the mobile station 1 communicating only with the single ratio base station (not performing the soft handover).

As a result, for example, the mobile station 1 is permitted to perform communications at 1 Mbps, and the mobile station 2 is permitted to perform communications at 800 kbps.

Alternatively, the radio network controller RNC may notify at least one of the radio base stations 1 and 2, of the maximum allowable transmission rate (the maximum value of the transmission rate) of the mobile station 2 performing soft handover.

Accordingly, for example, the maximum value of the mobile station 2 performing the soft handover is 500 kbps at most.

In this case, the mobile station 1 is permitted to perform transmission, for example, at 1.3 Mbps at most, and the mobile station 2 is permitted to perform transmission at 500 kbps at most.

In contrast, under conditions allowing sufficiently high transmission rates to be achieved, for example, in an off-peak traffic, fairness and high throughput can be obtained in a way that the radio base station is not signaled of the maximum value of the mobile station 2, which performs soft handover, by setting the aforementioned transmission rate ratio to "1," or in another equivalent way.

As has been described above, in this embodiment, the radio network controller RNC dynamically notifies the radio base stations, which are under the radio network controller RNC, of the transmission rate difference (or the transmission rate ratio) between the transmission rate of a mobile station performing the soft handover and the transmission rate of a mobile station not performing the soft handover, the soft handover performed between the mobile station and the radio base stations under the radio network controller RNC. Then, the radio base station controls the transmission rate of each mobile station according to the transmission rate difference or the transmission rate ratio. Thereby, when traffic is an off-peak, the radio quality can be improved by eliminating the difference between the transmission rate of the mobile station performing a soft handover and the transmission rate of the mobile station not performing the soft handover. On the other hand, when the traffic becomes congested, the throughput of the entire cell can be increased by decreasing the transmission rate of the mobile station performing the soft handover.

Alternatively, the same effect as described above can be obtained in a way that the radio network controller RNC dynamically notifies the radio base station of the maximum value of the transmission rate of the mobile station performing the soft handover, and then that the radio base station controls the transmission rate of each mobile station according to the maximum value of the transmission rate.

(Second Embodiment)

A scheduling section of a radio base station (each cell) in a transmission rate control system according to a second embodiment of the present invention is configured to determine a transmission rate difference or a transmission rate ratio between the transmission rate of a mobile station performing a soft handover and the transmission rate of a mobile station not performing the soft handover, and to control the transmission rate of each mobile station according to the determined transmission rate difference or the determined transmission rate ratio.

Moreover, this scheduling section may be configured to determine the maximum value of the transmission rate of the mobile station performing the soft handover, and to control the transmission rate of each mobile station according to the determined maximum value of the transmission rate.

Figure 13:
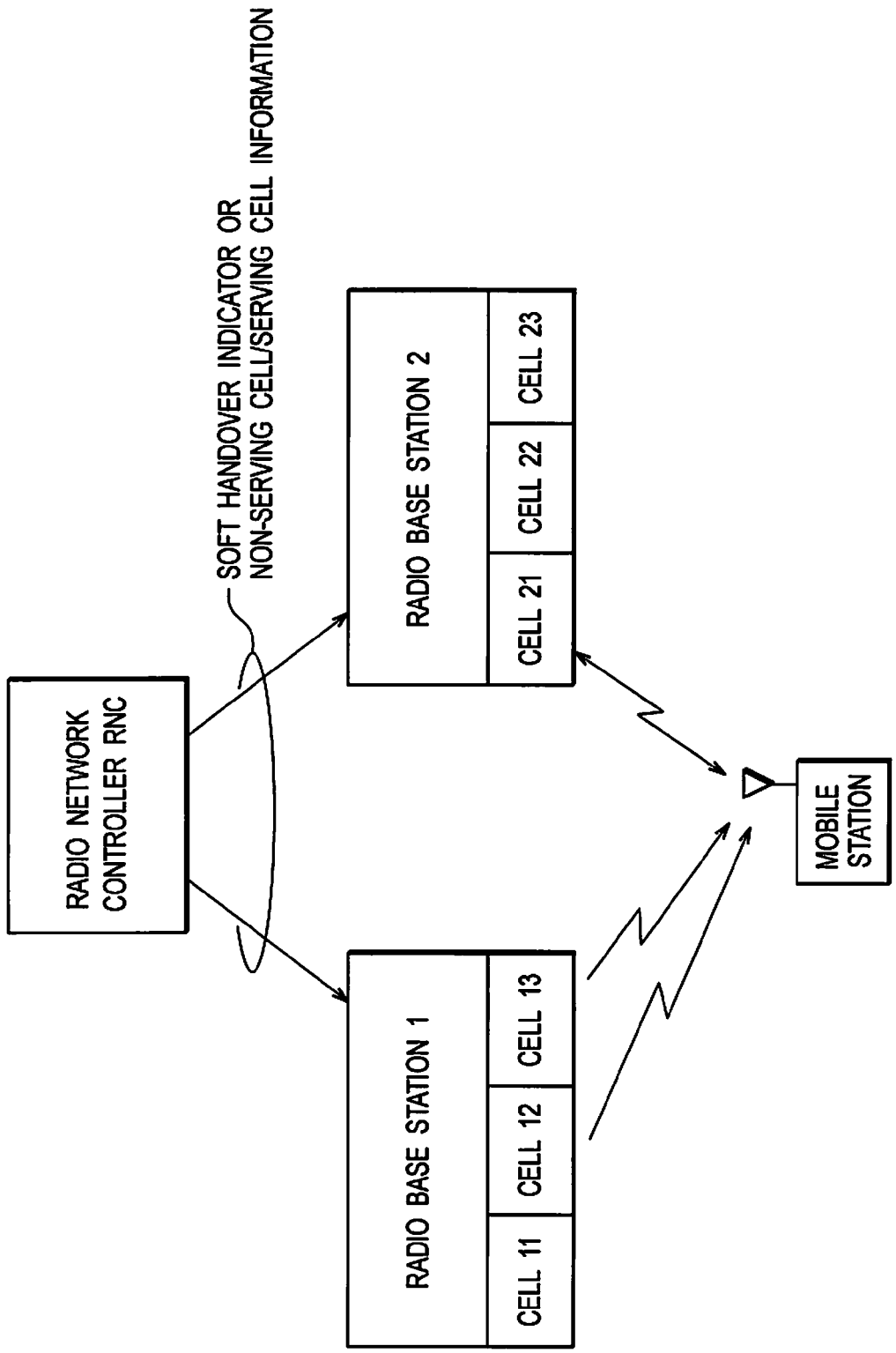
FIG. 13 is a diagram for explaining a transmission rate control method according to a second embodiment of the present invention.

Specifically, as shown in FIG. 13, by using a "soft handover indicator" or "non-serving cell/serving cell information" transmitted from a radio network controller RNC, the scheduling section determines whether or not each mobile station performs soft handover.

Here, the "soft handover indicator" indicates a soft handover state of each mobile station, and the "non-serving cell/serving cell information" indicates whether a cell corresponding to the scheduling section operates as a serving cell for a certain mobile station, or operates as a non-serving cell.

For example, in a case of using the "non-serving cell/serving cell information," this scheduling section is allowed to determine that the certain mobile station 1 performs soft handover only if, in the radio base station 1 to which the cell corresponding to the scheduling section belongs, there exist a cell 12 operating as the serving cell for the certain mobile station 1 and a cell 13 operating as the non-serving cell for the certain mobile station 1.

Although the present invention has been heretofore described in detail by using the embodiments, it is apparent for those skilled in the art that the present invention is not limited to the embodiments described in the present application. An apparatus of the present invention can be implemented as an amended or modified embodiment without departing from the sprit and scope of the present invention defined by the description of the scope of claims. Accordingly, the description of the present application aims to explain the examples, and is not intended to impose any limitation on the present invention.

INDUSTRIAL APPLICABILITY

Effect of the Invention

As has been described above, according to the present invention, a radio network controller dynamically notifies a radio base station of a transmission rate difference or a transmission rate ratio between a transmission rate of a mobile station performing a soft handover and a transmission rate of a mobile station not performing the soft handover. Then, the radio base station controls the transmission rate of each mobile station according to the transmission rate difference or the transmission rate ratio. Thereby, when traffic is off-peak, the radio quality can be improved by eliminating the difference between the transmission rate of the mobile station performing the soft handover and the transmission rate of the mobile station not performing the soft handover. On the other hand, when the traffic becomes congested, the throughput of the entire cell can be increased by decreasing the transmission rate of the mobile station performing the soft handover.

Alternatively, the same effect as described above can be obtained in a way that the radio network controller dynamically notifies the radio base station of the maximum value of the transmission rate of a mobile station performing the soft handover, and then the radio base station controls the transmission rate of each mobile station according to the notified maximum value of the transmission rate.

The invention claimed is:

1. A transmission rate control method for controlling a transmission rate of user data transmitted from a mobile station to a radio base station, comprising:
   notifying, from a radio network controller to the radio base station, a transmission rate difference or a transmission rate ratio between a transmission rate of a mobile station performing a soft handover and a transmission rate of a mobile station not performing the soft handover, the soft handover performed between the mobile station and the radio base station under the radio network controller; and
   controlling, at the radio base station, the transmission rate of each mobile station according to the notified transmission rate difference or the notified transmission rate ratio.

2. A transmission rate control method for controlling a transmission rate of user data transmitted from a mobile station to a radio base station, comprising:
   notifying, from a radio network controller to the radio base station, a maximum value of the transmission rate of a mobile station performing a soft handover with the radio base station under the radio network controller; and
   controlling, at the radio base station, the transmission rate of each mobile station according to the notified maximum value of the transmission rate.

3. A radio network controller used in a transmission rate control method for controlling a transmission rate of user data transmitted from a mobile station to a radio base station, comprising:
   a notifying section configured to notify, to the radio base station, a transmission rate difference or a transmission rate ratio between a transmission rate of a mobile station performing a soft handover and a transmission rate of a mobile station not performing the soft handover, the soft handover performed between the mobile station and the radio base station under the radio network controller.

4. A radio network controller used in a transmission rate control method for controlling a transmission rate of user data transmitted from a mobile station to a radio base station, comprising:
   a maximum value notifying section configured to notify, to the radio base station, a maximum value of the transmission rate of a mobile station performing a soft handover, the soft handover performed between the mobile station and the radio base station under the radio network controller.

5. A radio base station used in a transmission rate control method for controlling a transmission rate of user data transmitted from a mobile station to a radio base station, comprising:
   a determining section configured to determine a transmission rate difference or a transmission rate ratio between a transmission rate of a mobile station performing a soft handover and a transmission rate of a mobile station not performing the soft handover; and
   a controller configured to control the transmission rate of each mobile station according to the determined transmission rate difference or the determined transmission rate ratio.

6. A radio base station used in a transmission rate control method for controlling a transmission rate of user data transmitted from a mobile station to a radio base station, comprising:
   a maximum determining section configured to determine the maximum value of the transmission rate of a mobile station performing a soft handover; and
   a controller configured to control the transmission rate of each mobile station according to the determined maximum value of the transmission rate.

* * * * *